United States Patent
Uchida (10) Patent No.: US 8,854,216 B2
(45) Date of Patent: Oct. 7, 2014

(54) POWER TRANSMISSION DEVICE, WIRELESS POWER SUPPLY SYSTEM, AND WIRELESS POWER SUPPLY DEVICE

(75) Inventor: Akiyoshi Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 228 days.

(21) Appl. No.: 13/355,727

(22) Filed: Jan. 23, 2012

(65) Prior Publication Data

US 2012/0119914 A1   May 17, 2012

Related U.S. Application Data

(63) Continuation of application No. PCT/JP2009/063167, filed on Jul. 23, 2009.

(51) Int. Cl.
| | | |
|---|---|---|
| G08B 17/00 | (2006.01) | |
| H02J 7/02 | (2006.01) | |
| H02J 17/00 | (2006.01) | |
| H02J 5/00 | (2006.01) | |

(52) U.S. Cl.
CPC ............. H02J 5/005 (2013.01); H02J 7/025 (2013.01); H02J 17/00 (2013.01)
USPC ........................................ 340/584; 320/150

(58) Field of Classification Search
USPC ............ 340/584; 307/104; 320/108, 137, 150
See application file for complete search history.

(56) References Cited

U.S. PATENT DOCUMENTS

| | | | | |
|---|---|---|---|---|
| 8,159,182 B2 * | 4/2012 | Kato et al. | ..................... | 320/108 |
| 8,421,409 B2 * | 4/2013 | Ichikawa | ..................... | 320/108 |
| 2008/0164839 A1 | 7/2008 | Kato et al. | | |
| 2008/0278264 A1 | 11/2008 | Karalis et al. | | |
| 2011/0254376 A1 * | 10/2011 | Sasaki et al. | .................. | 307/104 |

FOREIGN PATENT DOCUMENTS

| | | |
|---|---|---|
| CN | 101304178 A | 11/2008 |
| EP | 1 998 343 A2 | 12/2008 |
| JP | 2001-258182 | 9/2001 |
| JP | 2002-010513 | 1/2002 |
| JP | 2003-153457 | 5/2003 |
| JP | 2008-172874 | 7/2008 |
| JP | 2008-206306 | 9/2008 |
| JP | 2008-295231 | 12/2008 |
| JP | 2009-022126 | 1/2009 |

OTHER PUBLICATIONS

Chinese Office Action for corresponding Chinese Patent Application No. 200980160535.2, issued Aug. 26, 2013.
International search report issued in PCT/JP2009/063167, mailed Oct. 13, 2009.
Extended European Search Report from corresponding European Patent Application No. 09847560.1, issued Sep. 30, 2013.

* cited by examiner

Primary Examiner — Toan N Pham
(74) Attorney, Agent, or Firm — Greer Burns & Crain Ltd.

(57) ABSTRACT

A power transmission device includes a power supply unit configured to supply power by a resonance frequency for magnetic resonance; a power transmission resonance coil capable of magnetic resonance with a power reception resonance coil in the resonance frequency, the power transmission resonance coil being configured to supply the power from the power supply unit as magnetic field energy caused by the magnetic resonance; a temperature detector provided in the power transmission resonance coil; and a control unit configured to refer to a table stored in a memory expressing an allowable temperature range, determine whether a detected temperature detected by the temperature detector at an elapsed time is within the allowable temperature range at the elapsed time, and stop an operation of the power supply unit when the detected temperature is not within the allowable temperature range.

7 Claims, 7 Drawing Sheets

| INITIAL TEMPERATURE Ti | | TEMPERATURE RISE PERIOD t0~t1 (SEC) | | | | | | | SATURATION PERIOD t1~t2 (SEC) |
|---|---|---|---|---|---|---|---|---|---|
| | TIME t | 0 s | 10 s | 20 s | 30 s | 40 s | 50 s | 60 s | EVERY 60s |
| 10 °C | MAXIMUM | 12 °C | 18 °C | 23 °C | 28 °C | 32 °C | 35 °C | 36 °C | 36 °C |
| | MINIUM | 8 °C | 14 °C | 19 °C | 24 °C | 28 °C | 31 °C | 32 °C | 32 °C |
| 15 °C | MAXIMUM | 17 °C | 24 °C | 30 °C | 36 °C | 41 °C | 45 °C | 47 °C | 47 °C |
| | MINIUM | 13 °C | 20 °C | 26 °C | 32 °C | 37 °C | 41 °C | 43 °C | 43 °C |
| 20 °C | MAXIMUM | 22 °C | 31 °C | 39 °C | 46 °C | 51 °C | 55 °C | 58 °C | 58 °C |
| | MINIUM | 18 °C | 27 °C | 35 °C | 42 °C | 47 °C | 51 °C | 54 °C | 54 °C |

# POWER TRANSMISSION DEVICE, WIRELESS POWER SUPPLY SYSTEM, AND WIRELESS POWER SUPPLY DEVICE

CROSS-REFERENCE TO RELATED APPLICATION

This patent application is based upon and claims the benefit of priority under 35 USC 120 and 365(c) of PCT application JP2009/063167 filed in Japan on Jul. 23, 2009, the entire contents of which are incorporated herein by reference.

FIELD

The present invention is related to wireless power supply, and more particularly to controlling wireless power supply.

BACKGROUND

As known techniques for supplying power in a wireless manner, there is the technique of supplying power by electromagnetic induction and the technique of supplying power by electric waves. Meanwhile, in recent years, a technique of supplying power by magnetic resonance has been proposed.

In a known wireless power supply system using magnetic resonance, for example, a resonance coil having a particular resonance frequency is disposed in a power transmission device, and a resonance coil having the same resonance frequency as the coil in the power transmission device is disposed in a power reception device. Between the power transmission device and the power reception device, magnetic field coupling is caused, which makes it possible to transfer electromagnetic energy by magnetic resonance. According to the magnetic field coupling, power is transmitted in a wireless manner from the resonance coil of the power transmission device to the resonance coil of the power reception device. With this system, the power transmission efficiency is increased approximately by several tens of percent. This makes it possible to space apart the power transmission device and the power reception device by a relatively long distance. For example, when the sizes of the resonance coils are approximately several tens of cm, the space between the resonance coils may be approximately several tens of cm or more.

A known non-contact power transmission device supplies power from a main unit to a terminal in a non-contact manner, through a first coil of the main unit and a second coil of the terminal. The power transmission device includes an over-temperature prevention device in the main body for automatically stopping the power supply to the terminal when a temperature higher than a predetermined level is detected.

A known non-contact charging device has a charging unit in which a barcode reader equipped with a secondary battery is set in a vertical manner on the top surface of the case of the charging device. On the bottom edge of the main unit case of the barcode reader, a power reception coil is provided. At the bottom of the charging unit of the charging device, a power transmission coil that is electromagnetically coupled with the power reception coil is provided. A temperature sensor for detecting the temperature of the power transmission coil is provided. The charge control circuit controls the charge current so that when the temperature detected by the temperature sensor is less than or equal to a set temperature, the charge current increases, and when the temperature detected by the temperature sensor exceeds the set temperature, the charge current decreases.

In a known non-contact charging device, a temperature detector element is provided at an optimum position that is obtained as follows. The area, the material, and the position of a metallic foreign body placed on the charger and the position of setting the temperature detector element are adjusted, while measuring the temperature rise of the metallic foreign body and the temperature detected by the temperature detector element. According to the measurement results, the optimum position of the temperature detector element is determined. Based on the temperature detected by the temperature detector element, when an abnormal temperature rise of the metallic foreign body is detected, the charging operation is immediately stopped. Specifically, the temperature detector element is provided at a contact surface between the charger and a primary side transmission coil, so that the center of the temperature detector element is located at a position 5 mm away from the center of the primary side transmission coil in the charger. Accordingly, the abnormal temperature rise of the metallic foreign body is accurately detected in a real-time manner, so that safety is enhanced.

A known method of charging a secondary battery involves changing the charge current of the secondary battery according to the temperature rise of the battery. The method of charging the secondary battery involves detecting the charge start temperature which is the battery temperature when the charging starts and the temperature rise gradient by which the temperature of the charged secondary battery rises. According to the detected charge start temperature and temperature rise gradient, the current switching temperature for switching the charge current is changed. Thus, the battery can be rapidly charged with a high current without degrading the battery performance.

Patent Document 1: Japanese Laid-Open Patent Publication No. 2001-258182
Patent Document 2: Japanese Laid-Open Patent Publication No. 2003-153457
Patent Document 3: Japanese Laid-Open Patent Publication No. 2008-172874
Patent Document 4: Japanese Laid-Open Patent Publication No. 2002-10513

The inventor has recognized that, for example, when the power reception resonance coil is not located within a preferable distance from the power transmission resonance coil, and when the power reception resonance coil does not satisfy the resonance conditions, the power transmitted from the power transmission resonance coil may not be sufficiently received by the power reception resonance coil. The inventor has recognized that, for example, when a foreign body satisfying the resonance conditions is located between the power transmission resonance coil and the power reception resonance coil, and when a foreign body that does not satisfy the resonance conditions but that acts as a load is located between the power transmission resonance coil and the power reception resonance coil, the power transmitted from the power transmission resonance coil may not be sufficiently received by the power reception resonance coil. Furthermore, the inventor has recognized that when power transmitted from the power transmission resonance coil is not sufficiently received by the power reception resonance coil, the power transmission resonance coil may produce heat. Thus, the transmitted electromagnetic energy is wasted, and the power transmission coil or the device that is the foreign body may break down.

SUMMARY

According to an aspect of an embodiment of the present invention, a power transmission device includes a power supply unit configured to supply power by a resonance frequency for magnetic resonance; a power transmission resonance coil capable of magnetic resonance with a power reception resonance coil in the resonance frequency, the power transmission resonance coil being configured to supply the power from the power supply unit as magnetic field energy caused by the magnetic resonance; a temperature detector provided in the power transmission resonance coil; and a control unit configured to refer to a table stored in a memory expressing an allowable temperature range, determine whether a detected temperature detected by the temperature detector at an elapsed time is within the allowable temperature range at the elapsed time, and stop an operation of the power supply unit when the detected temperature is not within the allowable temperature range.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

DESCRIPTION OF EMBODIMENTS

The objectives and advantages of the present invention are implemented and attained by the elements and combinations described in detail in the scope of claims.

The general descriptions given above and the detailed descriptions given below are for giving typical examples and descriptions, and are to be construed as not limiting the present invention.

A description is given of an embodiment of the present invention with reference to drawings. Throughout the drawings, the same components and elements are denoted by the same reference numerals.

Figure 1:
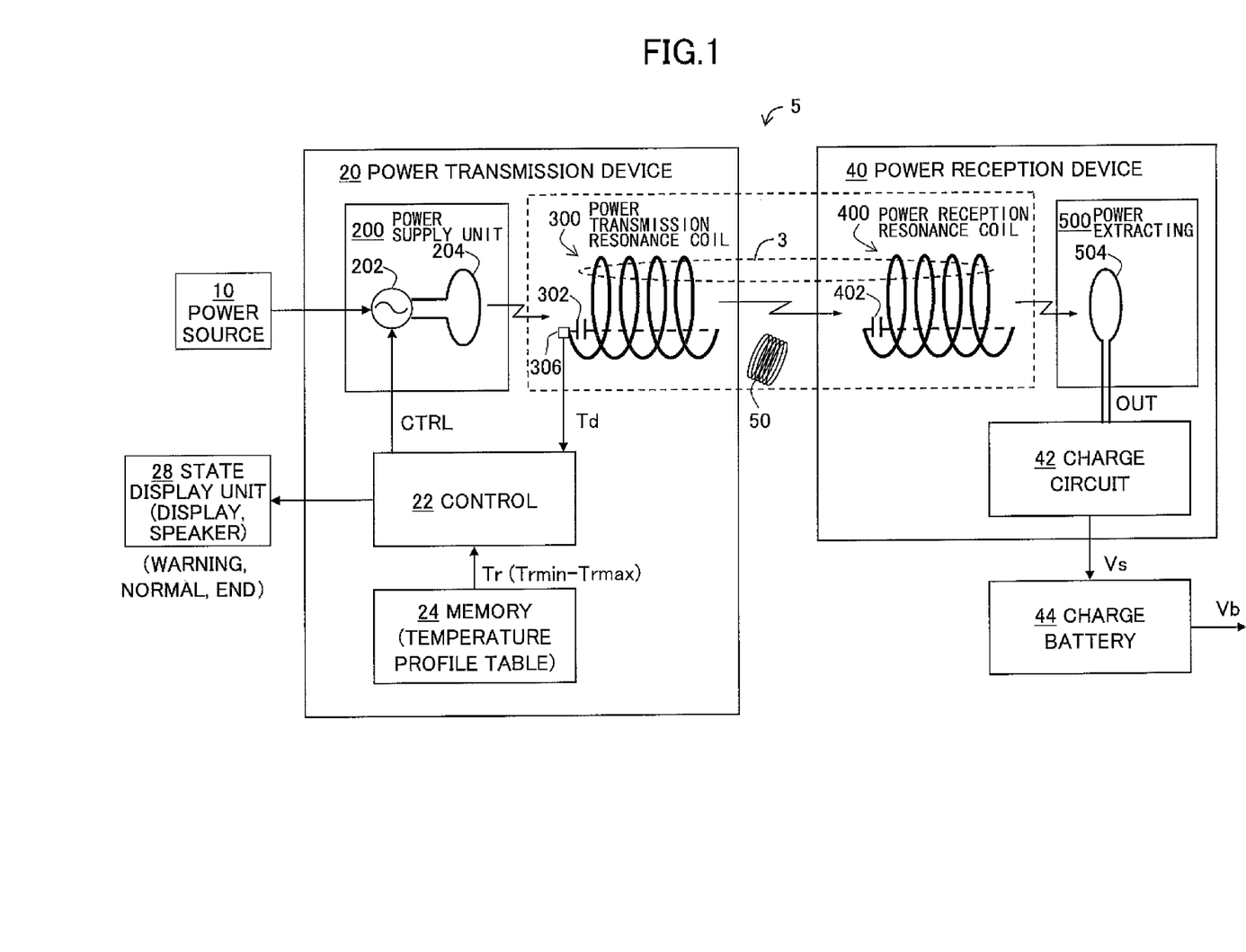
FIG. 1 illustrates an example of arrangements in a wireless power supply system including a power transmission device and a power reception device, according to an embodiment of the present invention.

FIG. 1 illustrates an example of arrangements in a wireless power supply system 5 including a power transmission device 20 and a power reception device 40.

The power transmission device 20 includes a control unit 22 installed in, for example, a processor such as a microprocessor or a microcomputer; a memory 24 including, for example, a ROM and a RAM; a power supply unit (or circuit) 200 for transmitting power; and a power transmission resonance coil 300. The power transmission device 20 functions as a wireless power supply device. The power reception device 40 includes a power reception resonance coil 400; a power extracting unit (or circuit) 500 for extracting power; and a charge circuit 42.

In the power transmission device 20, the power supply unit 200 includes an oscillation circuit 202, and preferably includes a power supply coil (or an electromagnetic induction coil) 204. The oscillation circuit 202 is connected to an external DC (direct-current) power source 10.

The power transmission resonance coil 300 may have both ends open. The power transmission resonance coil 300 has a temperature sensor 306, and may arbitrarily have a capacitor 302 that is electrically coupled in series with the power transmission resonance coil 300 for adjusting the capacitance C of the resonance conditions. The temperature sensor 306 may be, for example, a temperature detector using a thermocoupler and a voltage indicator.

The temperature sensor 306 detects a temperature Td of the power transmission resonance coil 300. The power transmission resonance coil 300 has an internal resistance that generates heat when a current flows through so that the temperature rises. When the power transmission resonance coil 300 is provided with the capacitor 302, the temperature sensor 306 is preferably disposed in contact with the capacitor 302 to detect the temperature Td of the capacitor 302. The capacitor 302 preferably includes an internal resistance per unit volume that is relatively larger than the resistance per unit volume of the power transmission resonance coil 300. Alternatively, the capacitor 302 preferably includes an internal resistance per unit length that is relatively larger than the resistance per unit length of the power transmission resonance coil 300. Accordingly, when a current flows to the power transmission resonance coil 300, heat is intensively generated, so that the sensitivity of the temperature sensor 306 is increased.

The control unit 22 is connected to an external state display unit 28. The state display unit 28 includes a display screen and/or a speaker. The control unit 22 causes the state display unit 28 to display, in a visible or audible manner, the power supply state of the power transmission resonance coil 300. The power supply state may be, for example, abnormal, warning, normal, and power transmission completed.

The control unit 22 determines the state of power transfer from the power transmission resonance coil 300 to the power reception resonance coil 400, by comparing the detected temperature Td detected by the temperature sensor 306 with an allowable range (Trmin through Trmax) of a reference temperature profile Tr with respect to the elapsed time t in a table in the memory 24. When the power supply from the power transmission device 20 to the power reception device 40 is not in a normal state, the control unit 22 stops supplying the power to the oscillation circuit 202 of the power supply unit 200, by control signals for controlling the oscillation circuit 202. As an alternative format or an additional format, when the power supply from the power transmission device 20 to the power reception device 40 is not in a normal state, the control unit 22 causes the state display unit 28 to display a warning indicating that the power supply state is abnormal, in either a visible manner with the display screen or in a audible manner with the speaker.

Figure 2:
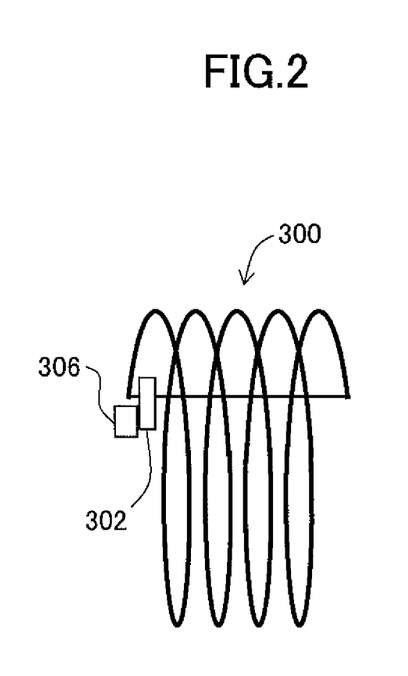
FIG. 2 illustrates an example of the position of a temperature sensor attached to (in contact with) a capacitor of a power transmission resonance coil.

FIG. 2 illustrates an example of the position of the temperature sensor 306 attached to (in contact with) the capacitor 302 of the power transmission resonance coil 300. The temperature sensor 306 is provided in contact with at least the capacitor 302 so as to be sufficiently thermally coupled. The temperature sensor 306 may also be provided in partial contact with the power transmission resonance coil 300 so as to be thermally coupled.

The control unit 22 may be a processor installed on an integrated circuit for control as a hardware element, or may be implemented in a processor that operates according to a control program stored in the memory 24.

In the power reception device 40, the power reception resonance coil 400 may have both ends open like the power transmission resonance coil 300. The power reception resonance coil 400 may arbitrarily have a capacitor 402 for adjusting the capacitance C, similar to the capacitor 302. The power reception resonance coil 400 has the same size and shape as the power transmission resonance coil 300, and when the power transmission resonance coil 300 includes the capacitor 302, the power reception resonance coil 400 also preferably similarly includes the capacitor 402.

The power extracting unit 500 preferably includes a power extracting coil (or an electromagnetic induction coil) 504 for extracting power from the power reception resonance coil 400. The power extracting unit 500 includes an output terminal OUT for supplying the power extracted from the power reception resonance coil 400 as a current.

The charge circuit 42 is coupled with the power extracting coil 504 of the power extracting unit 500. For example, the charge circuit 42 may include an AC-DC voltage converter, a rectifier circuit, and a charge control circuit. The charge circuit 42 supplies a DC voltage Vs to, for example, an internal or external battery 44 that can be charged. For example, the battery 44 may be for supplying a DC voltage Vb to an electronic device that consumes power, such as an electrical vehicle, a robot, and a personal computer. The battery 44 may be part of the electronic device.

In FIG. 1, between the power transmission resonance coil 300 and the power reception resonance coil 400, magnetic field coupling 3 is caused due to magnetic resonance. The resonance frequency ft of the power transmission resonance coil 300 and the resonance frequency fr of the power reception resonance coil 400 are the same or substantially the same. The power transmission device 20 can transmit electromagnetic energy or power to the power reception device 40 by coupling according to magnetic resonance. Coupling according to magnetic resonance is effective even if the distance between the power transmission resonance coil 300 and the power reception resonance coil 400 is longer than the distance at which electromagnetic induction is caused.

The range in which the resonance frequencies ft and fr are substantially the same becomes smaller as the Q-value increases, and this range becomes larger as the Q-value decreases. The range in which the resonance frequencies ft and fr are substantially the same is the frequency range in which the transmission efficiency is higher than that of electromagnetic induction. For example, the range may be a frequency range at which the Q-value at the resonance point is half the maximum value.

The shapes of the power transmission resonance coil 300 and the power reception resonance coil 400 may be substantially the same, or may be different. For example, the power transmission resonance coil 300 and the power reception resonance coil 400 may be helical coils made of copper having a diameter of 20 cm through 40 cm. The distance between the power transmission resonance coil 300 and the power reception resonance coil 400 may be, for example, 50 cm through 250 cm. The resonance frequency may be, for example, 5 MHz through 20 MHz.

Each of the power transmission resonance coil 300 and the power reception resonance coil 400 is made of, for example, a single coil, and has an inductance L and a capacitance C that satisfy the resonance conditions. The capacitance C may be formed according to the floating capacitance of the power transmission resonance coil 300 or the power reception resonance coil 400. The capacitance C may be adjusted by the capacitance of the capacitor 302 or the capacitor 402 coupled with the power transmission resonance coil 300 or the power reception resonance coil 400, respectively. Therefore, when the capacitor 302 or the capacitor 402 is used, the capacitance C expresses the combined capacitance of the floating capacitance and the capacitor 302 or the capacitor 402.

The impedance Z of the power transmission resonance coil 300 and the power reception resonance coil 400 is expressed by the following formula.

$$Z = R + i(\omega L - 1/\omega C)$$

Here, R expresses the internal resistance of the power transmission resonance coil 300 and the power reception resonance coil 400 and/or the combined resistance of the floating capacitance and the internal resistance of the capacitor 302 or the capacitor 402.

The LC resonance frequency $f(Hz) = \omega/2\pi$ of the power transmission resonance coil 300 and the power reception resonance coil 400 is expressed by the following formula.

$$f = 1/(2\pi(LC)^{1/2})$$

In order to increase the Q-value ($=1/R \times (L/C)^{1/2}$), the oscillation circuit 202 does not need to be directly connected to the power transmission resonance coil 300. The Q-value expressing the sharpness of resonance is determined by the resistance and the radiation resistance of the coil and the capacitor. The Q-value increases as a combined resistance R decreases. The combined resistance R is the combination of the resistance and the radiation resistance of the coil and the capacitor.

When the power transmission resonance coil 300 and the power reception resonance coil 400 satisfying the resonance condition (ft=fr) are brought close to each other, the power reception resonance coil 400 resonates with the magnetic field formed by the power transmission resonance coil 300, and an alternating current is generated. This resonation phenomenon caused by a magnetic field is sometimes referred to as a magnetic resonance mode.

In the power transmission device 20, the oscillation circuit 202 of the power supply unit 200 supplies power to the power supply coil 204. The oscillation circuit 202 may be, for example, a Colpitts oscillating circuit. However, the oscillation circuit 202 is not limited to a Colpitts oscillating circuit and may be another type of oscillating circuit. For example, the oscillation circuit 202 may directly or indirectly supply power to the power supply coil 204 by the resonance frequency ft for magnetic resonance. However, the oscillation frequency of the oscillation circuit 202 may be different from the resonance frequency ft of the power transmission resonance coil 300.

The power supply coil 204 may supply the power supplied from the oscillation circuit 202 to the power transmission resonance coil 300 by electromagnetic induction. In this case, the power transmission resonance coil 300 and the power supply coil 204 are positioned at a close distance from each other so that power can be supplied by electromagnetic induction, and there is no need to consider the resonance frequency of the power supply coil 204.

As described above, power is efficiently supplied from the power transmission resonance coil 300 to the power reception resonance coil 400 by magnetic resonance.

In the power reception device 40, the power reception resonance coil 400 receives power from the power transmission resonance coil 300 by magnetic field coupling according to magnetic resonance. The power reception resonance coil 400 supplies the received power or current to the power extracting unit 500. The power extracting unit 500 may receive power from the power reception resonance coil 400 by the power extracting coil 504 according to electromagnetic induction. In this case, the power reception resonance coil 400 and the power extracting coil 504 are positioned at a close distance from each other so that power can be supplied by electromagnetic induction, and there is no need to consider the resonance frequency of the power extracting coil 504.

The power extracting coil 504 supplies an alternating current to the charge circuit 42 acting as a load. The charge circuit 42 is adapted to supply the DC voltage Vs to the battery 44 by rectifying the alternating current. The battery 44 supplies a DC voltage Vb. Instead of the charge circuit 42, an electronic device, a battery, an electric motor, and an electric machine may be connected as the load.

FIGS. 3A through 3D illustrate examples of surrounding situations when the temperature of the power transmission resonance coil 300 is outside the allowable range.

Figure 3A:
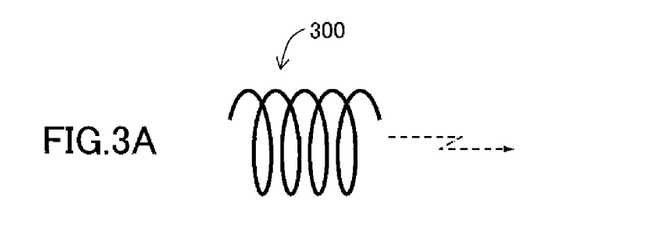
FIGS. 3A through 3D illustrate examples of surrounding situations when the temperature of the power transmission resonance coil is outside the allowable range.

For example, as illustrated in FIG. 3A, when the power reception resonance coil 400 is not located within the desirable distance from the power transmission resonance coil 300, the power supplied by the power transmission resonance coil 300 is not absorbed due to external factors. Thus, the power transmitted by the power transmission resonance coil 300 is wasted. Furthermore, the power transmission resonance coil 300 and surrounding elements may break down due to heat.

Figure 3B:
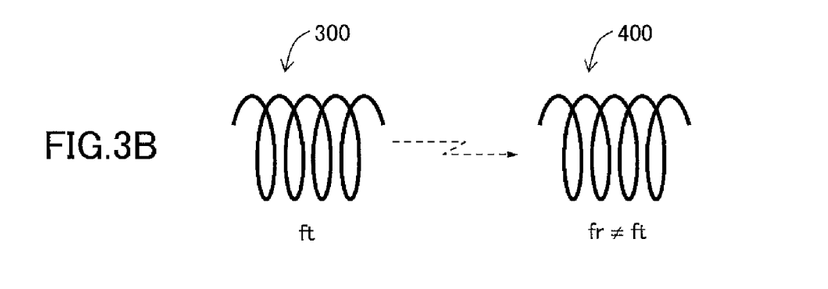

Furthermore, for example, as illustrated in FIG. 3B, when the resonance frequency fr of the power reception resonance coil 400 does not satisfy the resonance condition (fr≠ft), the power supplied by the power transmission resonance coil 300 is not absorbed due to external factors. Thus, the power transmitted by the power transmission resonance coil 300 is wasted, and the power reception resonance coil 400 hardly receives any power. Furthermore, the power transmission resonance coil 300 and surrounding elements may break down due to heat.

Figure 3C:
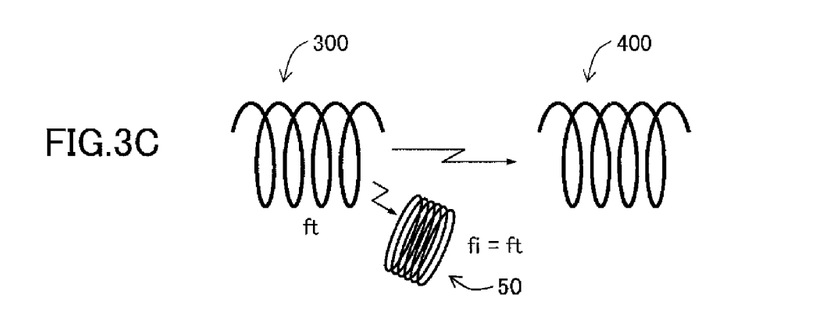

Furthermore, for example, as illustrated in FIG. 3C, when a foreign body 50 satisfying the resonance condition (fi=ft) is located between the power transmission resonance coil 300 and the power reception resonance coil 400, at least part of the transmitted power is absorbed by the foreign body 50, and therefore at least part of the power transmitted from the power transmission resonance coil 300 is wasted. Furthermore, the device that is the foreign body 50 may break down due to heat. In this case, the temperature of the power transmission resonance coil 300 may drop below the allowable range.

Figure 3D:
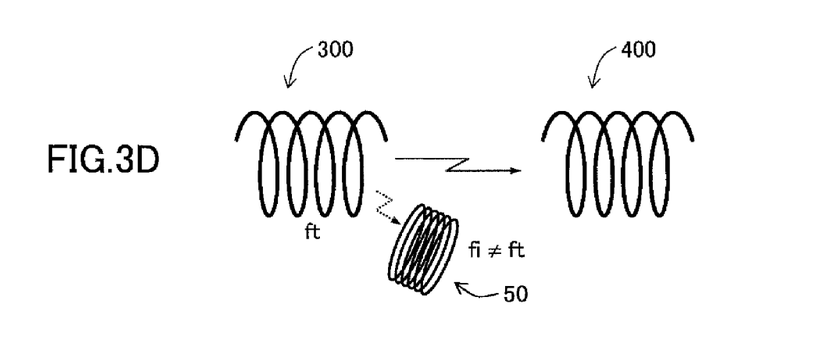

Furthermore, for example, as illustrated in FIG. 3D, when a foreign body 50 that does not satisfy the resonance condition (fi≠ft) but acts as a load is located between the power transmission resonance coil 300 and the power reception resonance coil 400, the resonance condition of the power transmission resonance coil 300 and the power reception resonance coil 400 changes due to the foreign body 50. Accordingly, the power transmission resonance coil 300 and the power reception resonance coil 400 no longer satisfy the resonance condition, i.e., the Q-value decreases, and the power supplied by the power transmission resonance coil 300 cannot be efficiently transmitted to the power reception resonance coil 400, and therefore part of the power transmitted by the power transmission resonance coil 300 is wasted.

As described above, when the power transmitted from the power transmission resonance coil 300 cannot be sufficiently received by the power reception resonance coil 400, the temperature of the power transmission resonance coil 300 may rise or fall. The temperature sensor 306 detects a temperature Td of the power transmission resonance coil 300 or the capacitor 302. The temperature Td detected by the temperature sensor 306 is reported to the control unit 22.

The control unit 22 determines whether the temporal change of the detected temperature Td, after starting power transmission, is within the allowable range (Trmin through Trmax) of temperature variations in a reference temperature profile Tr with respect to the elapsed time t in a table in the memory 24. When the detected temperature Td is not within the allowable range, the control unit 22 stops the oscillation circuit 202 of the power supply unit 200.

Accordingly, the control unit 22 determines the status of power transfer from the power transmission resonance coil 300 to the power reception resonance coil 400 based on the detected temperature Td detected by the temperature sensor 306. When the detected temperature Td is outside the allowable range (Trmin through Trmax) of a reference temperature profile Tr, the control unit 22 supplies, to the oscillation circuit 202, control signals CTRL for controlling the oscillation circuit 202 of the power supply unit 200, and stops the power transmission from the power transmission resonance coil 300.

Figure 4:
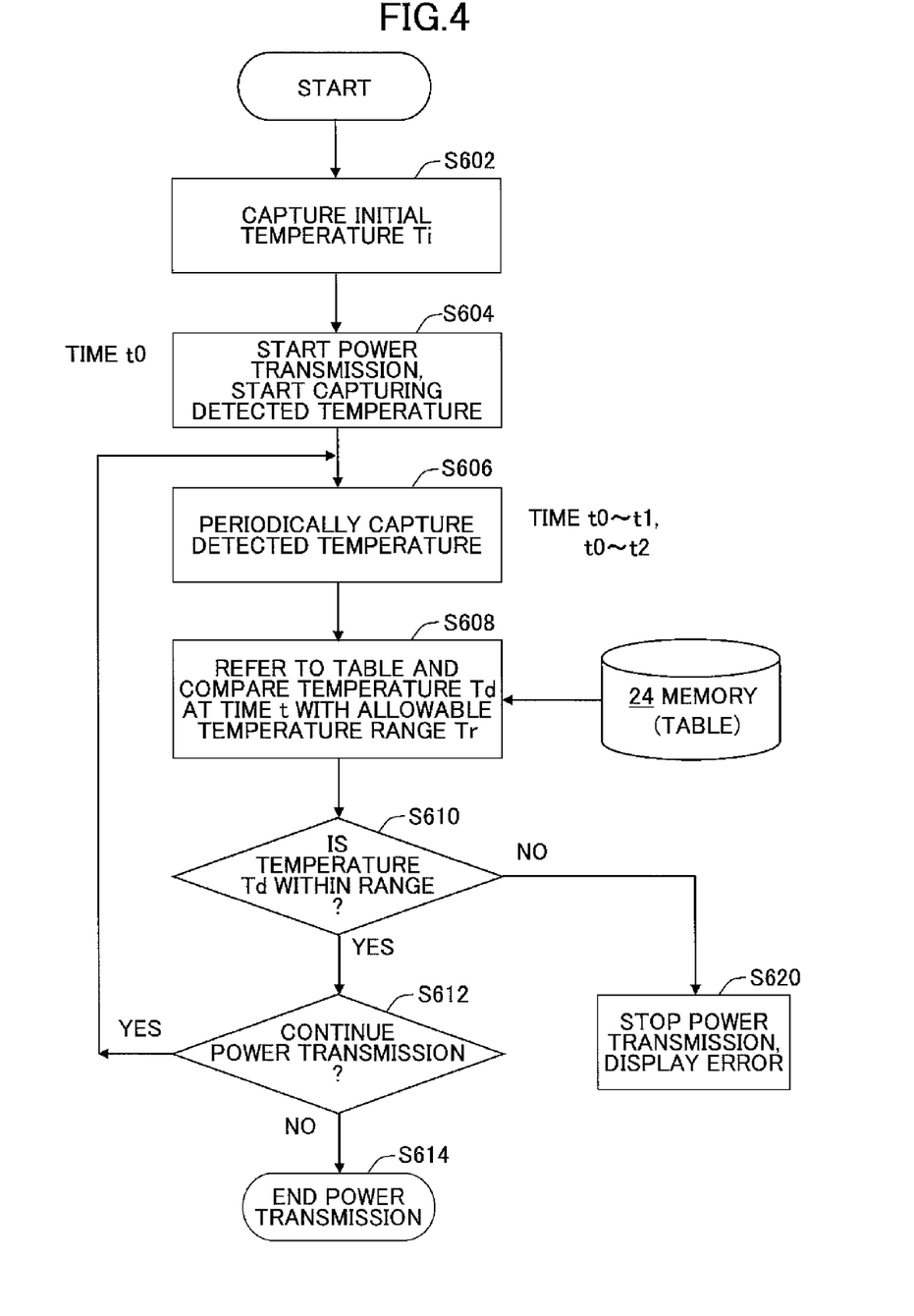
FIG. 4 is an example of a flowchart of a process executed by a control unit of the power transmission device, for controlling the power supply circuit in accordance with the detected temperature.

FIG. 4 is an example of a flowchart of a process executed by the control unit 22 of the power transmission device 20, for controlling the power supply unit 200 in accordance with the detected temperature Td.

Figure 5:
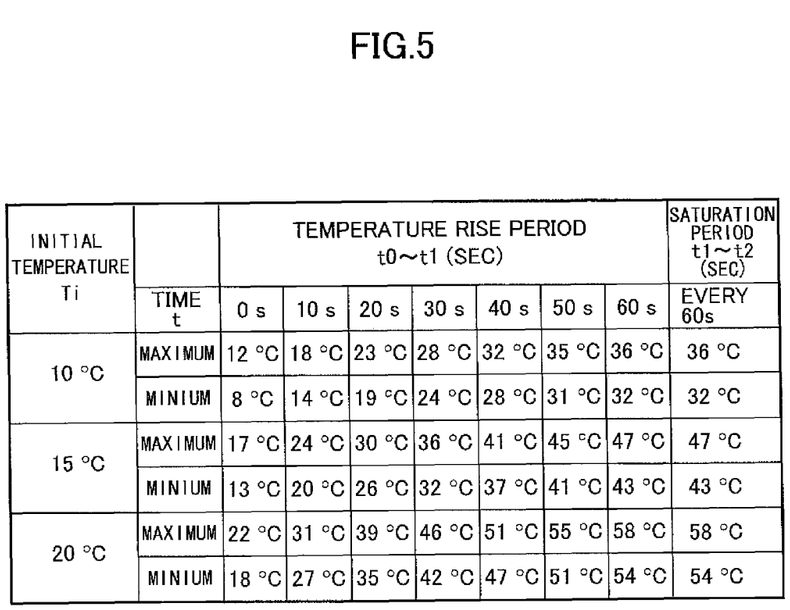
FIG. 5 illustrates an example of a temperature profile table indicating allowable ranges of reference temperature profiles at elapsed times with respect to initial temperatures, stored in the memory.

FIG. 5 illustrates an example of a temperature profile table indicating allowable ranges (Trmin, Trmax) of reference temperature profiles Tr at the elapsed times t with respect to initial temperatures Ti, stored in the memory 24. For example, the reference temperature profile table may include the maximum allowable temperature Trmax and the minimum allowable temperature Trmin at intervals of 10 seconds within a temperature rise period t0 through t1, or the maximum allowable temperature Trmax and the minimum allowable temperature Trmin at intervals of 60 seconds within a temperature saturation period t1 to t2, for plural initial temperatures Ti at intervals of 1.0° C.

Figure 6A:
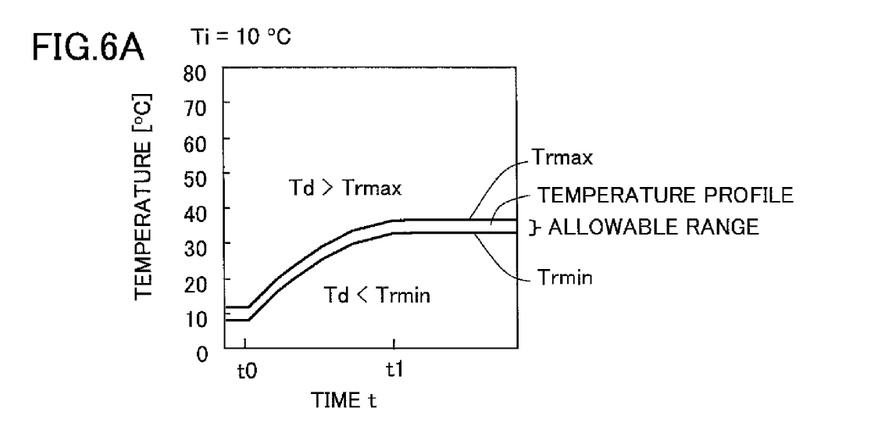
FIGS. 6A through 6C are examples of graphs indicating the relationship between the detected temperature at elapsed times, and the allowable range of the reference temperature profile at elapsed time in the reference temperature profile table of FIG. 5.
Figure 6B:
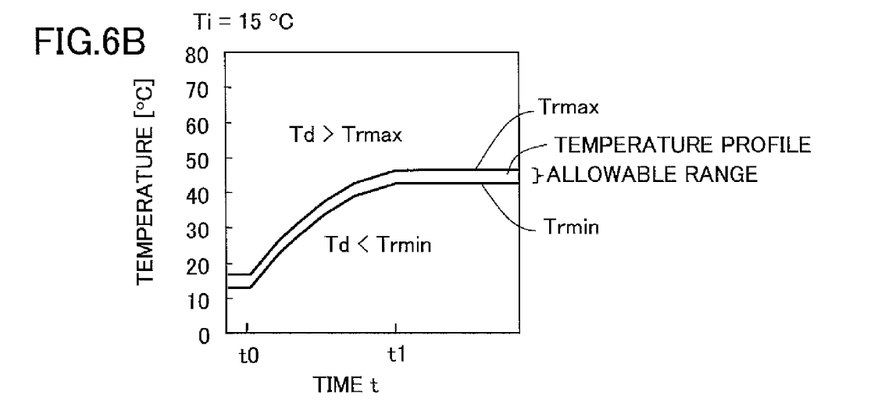
Figure 6C:
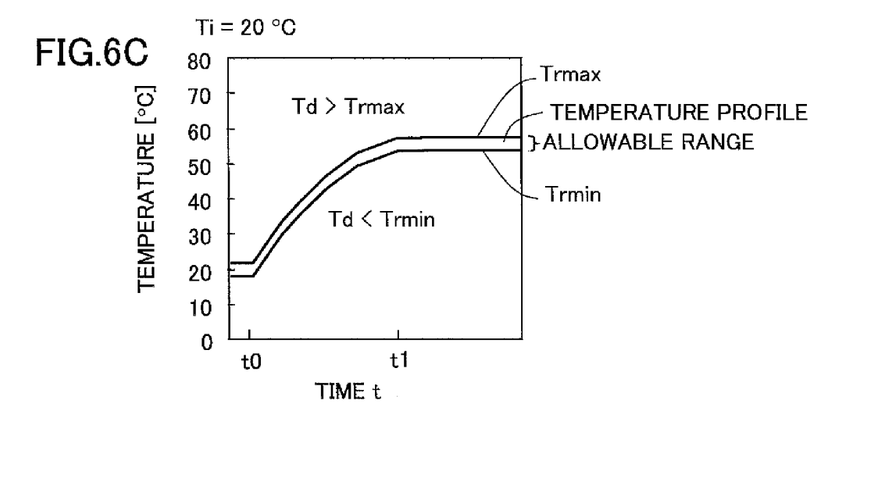

FIGS. 6A through 6C are examples of graphs indicating the relationship between the detected temperature Td at elapsed times t, and the allowable range (Trmin, Trmax) of the reference temperature profile Tr at elapsed times t in the reference temperature profile table of FIG. 5.

Referring to FIG. 4, in step S602, the control unit 22 captures the initial (t0) detected temperature Ti of the temperature sensor 306.

In step S604, the control unit 22 activates the oscillation circuit 202 of the power supply unit 200 at the power transmission start time t0, and starts capturing the detected temperature Ti of the temperature sensor 306 at the elapsed times t in the reference temperature profile table. However, the elapsed times t in the reference temperature profile table and the actual elapsed times t when the temperature is detected or when the detected temperature is captured do not need to match precisely.

In step S606, the control unit 22 captures the detected temperature Td of the temperature sensor 306 at the elapsed times t after starting power transmission indicated in the reference temperature profile table in the memory 24.

In step S608, the control unit 22 refers to the reference temperature profile table in the memory 24 as indicated in, for example, FIG. 5, and compares the profile of the detected temperature Td at the elapsed time t with the allowable temperature range (Trmin, Trmax) of the reference temperature profile Tr at the same elapsed time t. When the time t of detecting the temperature does not match the elapsed time t in the table, the captured allowable temperature range may be calculated, for example by proportional division, based on the allowable temperature ranges at the elapsed times t in the table near (before and after) the target elapsed time t.

In step S610, the control unit 22 determines whether the detected temperature Td is within the allowable temperature range (Trmin, Trmax) of the reference temperature profile Tr.

Referring to FIGS. 5 and 6A through 6C, when the initial detected temperature is, for example, Ti=10° C., the control unit 22 selects, for example, the allowable temperature range (Trmin, Trmax) of the corresponding reference temperature profile Tr identified by the corresponding initial temperature Ti in the reference temperature profile table of FIG. 5. The control unit 22 compares the detected temperature Td at the corresponding elapsed time t with the maximum allowable temperature Trmax and the minimum allowable temperature Trmin in the allowable range, and determines whether the detected temperature Td is less than or equal to the maximum allowable temperature Trmax and greater than or equal to the minimum allowable temperature Trmin. If the detected temperature Td is within the allowable range, the control unit 22 determines that the power transmission state of the power transmission resonance coil 300 is normal. Meanwhile, if the detected temperature Td is outside the allowable range, the control unit 22 determines that the power transmission state of the power transmission resonance coil 300 is abnormal.

When it is determined that the detected temperature Td is within the allowable temperature range (Trmin, Trmax), the process proceeds to step S612. When it is determined that the detected temperature Td is outside the allowable temperature range, the process proceeds to step S620. In step S620, the control unit 22 stops the operation of the oscillation circuit 202, and causes the external state display unit 28 to visually or audibly display an error.

In step S612, the control unit 22 determines whether to continue power transmission. For example, the control unit 22 determines whether the power transmission end time t2 set in advance has passed. When the control unit 22 determines not to continue power transmission, in step S614, the control unit 22 stops the operation of the oscillation circuit 202, and causes an external state display unit 28 to visually or audibly display that the power transmission has normally ended.

In step S612, when the control unit 22 determines to continue power transmission, the process returns to step S606. In step S606, the control unit 22 captures the detected temperature Td of the temperature sensor 306 at times t0 through t2 after starting power transmission.

In elapsed times t0 through t1 during which the temperature becomes saturated in the reference temperature profile table, the control unit 22 captures the detected temperature Td at short periods of, for example, 10 seconds. In the elapsed times t1 through t2 after the reference temperature Tr has become substantially saturated in the reference temperature profile table, the control unit 22 captures the detected temperature Td at long periods of, for example, 60 seconds.

Figure 7:
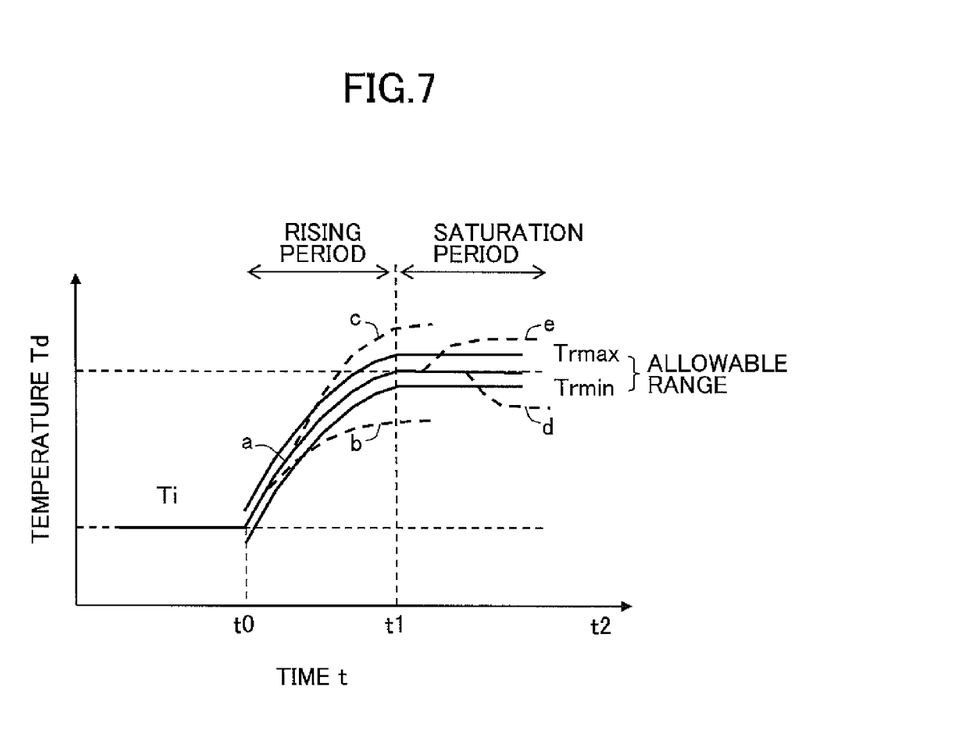
FIG. 7 indicates the relationship between the allowable temperature range of the reference temperature profile and the profiles of the detected temperature.

FIG. 7 indicates the relationship between the allowable temperature range (Trmin, Trmax) of the reference temperature profile Tr and the profiles of the detected temperature Td (a through e).

In FIG. 7, when the profile of the detected temperature Td changes within the allowable range (Trmin, Trmax) of the reference temperature profile Tr as indicated by the temperature curve a, it is considered that the power transmission state of the power transmission resonance coil 300 is normal.

When the profile of the detected temperature Td changes outside the allowable range (Trmin, Trmax) of the reference temperature profile Tr as indicated by the temperature curve b in the temperature rise period t0 through t1, and is lower than the minimum allowable temperature Trmin, it is considered that the power transmission state of the power transmission resonance coil 300 is abnormal. In this case, for example, it is considered that the foreign body 50 satisfying the resonance condition as illustrated in FIG. 3C is located between the power transmission resonance coil 300 and the power reception resonance coil 400.

When the profile of the detected temperature Td changes outside the allowable range (Trmin, Trmax) of the reference temperature profile Tr as indicated by the temperature curve c in the temperature rise period t0 through t1, and is higher than the maximum allowable temperature Trmax, it is considered that the power transmission state of the power transmission resonance coil 300 is abnormal. In this case, for example, it is considered that the power reception resonance coil 400 is not located within a preferable distance as illustrated in FIG. 3A, or the power reception resonance coil 400 does not satisfy the resonance conditions as illustrated in FIG. 3B.

When the profile of the detected temperature Td changes outside the allowable range (Trmin, Trmax) of the reference temperature profile Tr after saturation as indicated by the temperature curve e in the temperature saturation period t1 through t2, and is higher than the maximum allowable temperature Trmax, it is considered that the power transmission state of the power transmission resonance coil 300 is abnormal. In this case, for example, it is considered that the foreign body 50 not satisfying the resonance conditions as illustrated in FIG. 3D has entered between the power transmission resonance coil 300 and the power reception resonance coil 400, or the power reception resonance coil 400 is not located within a preferable distance as illustrated in FIG. 3A, or the power reception resonance coil 400 does not satisfy the resonance conditions (fr=ft) as illustrated in FIG. 3B.

When the power transmission state of the power transmission resonance coil 300 is abnormal as indicated by b through e in FIG. 7, the control unit 22 stops the operation of the power transmission device 20, stops the power transmission by the power transmission resonance coil 300, and causes the display device to display an error. Accordingly, it is possible to prevent wasteful power transmission, and to prevent serious breakdowns or crucial accidents from occurring.

According to the disclosed wireless power supply system, the state of power supply from a power transmission device can be detected, and power transmission can be stopped when power supply from the power transmission device is not in a normal state.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A power transmission device comprising:
a power supply unit configured to supply power by a resonance frequency for magnetic resonance;
a power transmission resonance coil capable of magnetic resonance with a power reception resonance coil in the resonance frequency, the power transmission resonance coil being configured to supply the power from the power supply unit as magnetic field energy caused by the magnetic resonance;
a temperature detector provided in the power transmission resonance coil; and
a control unit configured to refer to a table stored in a memory expressing an allowable temperature range, determine whether a detected temperature detected by the temperature detector at an elapsed time is within the allowable temperature range at the elapsed time, and stop an operation of the power supply unit when the detected temperature is lower than a lowest temperature of the allowable temperature range and when the detected temperature is higher than a highest temperature of the allowable temperature range.

2. The power transmission device according to claim 1, wherein
the control unit is configured to capture the detected temperature at plural time points in a period before operation start and a period after operation start of the power supply unit, refer to data expressing an allowable temperature range at a second time point in the period after operation start in the table based on the detected temperature at a first time point in the period before operation start, and determine whether the detected temperature at the second time point is within the allowable temperature range at the second time point.

3. The power transmission device according to claim 2, wherein
the allowable temperature range includes a maximum allowable temperature and a minimum allowable temperature for plural time points in the period after operation start with respect to the first time point.

4. The power transmission device according to claim 1, wherein
a capacitor is electrically coupled with the power transmission resonance coil, and
the temperature detector measures a temperature of the capacitor.

5. The power transmission device according to claim 1, wherein
the control unit is configured to visually or audibly display a message when the detected temperature is not within the allowable temperature range.

6. A wireless power supply system comprising:
a power supply unit configured to supply power by a resonance frequency for magnetic resonance;
a power transmission resonance coil capable of magnetic resonance with a power reception resonance coil in the resonance frequency, the power transmission resonance coil being configured to supply the power from the power supply unit as magnetic field energy caused by the magnetic resonance;
a temperature detector provided in the power transmission resonance coil;
a control unit configured to determine whether a detected temperature detected by the temperature detector at an elapsed time is within an allowable temperature range at an elapsed time, and stop an operation of the power supply unit when the detected temperature is lower than a lowest temperature of the allowable temperature range and when the detected temperature is higher than a highest temperature of the allowable temperature range; and
a power reception resonance coil capable of magnetic resonance with the power transmission resonance coil in the resonance frequency, the power reception resonance coil being configured to receive the magnetic field energy transmitted from the power transmission resonance coil by the magnetic resonance.

7. A wireless power supply device comprising:
a power supply unit configured to supply power by a resonance frequency for magnetic resonance;
a power transmission resonance coil capable of magnetic resonance with a power reception resonance coil in the resonance frequency, the power transmission resonance coil being configured to supply the power from the power supply unit as magnetic field energy caused by the magnetic resonance;
a temperature detector provided in the power transmission resonance coil; and
a control unit configured to refer to a table stored in a memory expressing an allowable temperature range, determine whether a detected temperature detected by the temperature detector at an elapsed time is within the allowable temperature range at the elapsed time, and stop an operation of the power supply unit when the detected temperature is lower than a lowest temperature of the allowable temperature range and when the detected temperature is higher than a highest temperature of the allowable temperature range.

* * * * *